(12) United States Patent
Knobel

(10) Patent No.: US 10,289,612 B2
(45) Date of Patent: May 14, 2019

(54) PERSONAL FOOD INVENTORY-BASED TRACKING

(71) Applicant: Foogal, Inc., Fairbury, NE (US)

(72) Inventor: Todd Knobel, Fairbury, NE (US)

(73) Assignee: Foogal Inc., Fairbury, NE (US)

( * ) Notice: Subject to any disclaimer, the term of this patent is extended or adjusted under 35 U.S.C. 154(b) by 0 days.

(21) Appl. No.: 15/143,388

(22) Filed: Apr. 29, 2016

(65) Prior Publication Data

US 2016/0358121 A1  Dec. 8, 2016

Related U.S. Application Data

(60) Provisional application No. 62/162,482, filed on May 15, 2015, provisional application No. 62/162,490, filed on May 15, 2015, provisional application No. 62/162,493, filed on May 15, 2015, provisional application No. 62/162,497, filed on May 15, 2015.

(51) Int. Cl.
| | |
|---|---|
| *G06F 19/00* | (2018.01) |
| *G06F 16/23* | (2019.01) |
| *G06Q 10/08* | (2012.01) |
| *G06K 19/06* | (2006.01) |
| *G06Q 20/04* | (2012.01) |

(52) U.S. Cl.
CPC ....... *G06F 16/23* (2019.01); *G06K 19/06009* (2013.01); *G06K 19/06028* (2013.01); *G06Q 10/087* (2013.01); *G06Q 20/04* (2013.01)

(58) Field of Classification Search
CPC .......................... G06Q 10/087; G06Q 10/0833
USPC .............. 235/385, 383, 380, 462.45, 462.46, 235/472.02
See application file for complete search history.

(56) References Cited

U.S. PATENT DOCUMENTS

| | | | |
|---|---|---|---|
| 2 | A | 7/1836 | Goulding |
| 5,841,115 | A | 11/1998 | Shepley |

(Continued)

FOREIGN PATENT DOCUMENTS

WO  WO 2015/011802 A1  1/2015

OTHER PUBLICATIONS

PCT Invitation to Pay Additional Fees, PCT Application No. PCT/US2016/030467, dated Jun. 24, 2016, 2 pages.

(Continued)

*Primary Examiner* — Daniel St Cyr
(74) *Attorney, Agent, or Firm* — Wilson Sonsini Goodrich & Rosati

(57) ABSTRACT

A personal food inventory system (PFIS) allows for storage of food items in a personal inventory associated with a user account, as well as tracking of food items consumed by the user account. The PFIS is linked to an application for communicating between an account user and the PFIS items that are received into the personal inventory and items consumed or otherwise removed from the personal inventory. The PFIS is linked to one or more preferred vendors for easy entry of items into the personal inventory. The PFIS also provides recommendation of dishes the account user can prepare based on the personal food inventory and/or a vendor inventory associated with the preferred vendor. The PFIS further provides user notifications for items nearing their expiry date. The PFIS also provides notification to the account user regarding usage of the personal food inventory system by tracking consumption.

24 Claims, 11 Drawing Sheets

(56) References Cited

U.S. PATENT DOCUMENTS

| | | | |
|---|---|---|---|
| 7,065,501 B1* | 6/2006 | Brown | G06Q 10/087 705/22 |
| 8,541,115 B2 | 9/2013 | Tryon et al. | |
| 8,965,796 B1 | 2/2015 | Gala | |
| 2004/0117276 A1 | 6/2004 | Kettler et al. | |
| 2004/0195309 A1 | 10/2004 | Wagner et al. | |
| 2005/0258961 A1* | 11/2005 | Kimball | G06Q 20/203 340/572.1 |
| 2008/0198012 A1 | 8/2008 | Kamen | |
| 2008/0250797 A1 | 10/2008 | Rozendaal et al. | |
| 2008/0306813 A1 | 12/2008 | Romansky | |
| 2009/0099873 A1 | 4/2009 | Kurple | |
| 2009/0258331 A1 | 10/2009 | Do et al. | |
| 2009/0313112 A1 | 12/2009 | Champ et al. | |
| 2010/0179881 A1 | 7/2010 | Wiederstein | |
| 2012/0101876 A1 | 4/2012 | Turvey et al. | |
| 2013/0067375 A1 | 3/2013 | Kim et al. | |
| 2013/0138656 A1 | 5/2013 | Wheaton | |
| 2013/0173339 A1* | 7/2013 | Briancon | G06Q 30/0201 705/7.29 |
| 2013/0216982 A1* | 8/2013 | Bennett | G09B 5/00 434/127 |
| 2014/0324899 A1 | 10/2014 | Sherman et al. | |
| 2015/0269649 A1* | 9/2015 | Shoemaker | G06Q 30/0633 705/26.8 |
| 2015/0294393 A1 | 10/2015 | Aikawa | |
| 2018/0011889 A1 | 1/2018 | Knobel | |

OTHER PUBLICATIONS

PCT International Search Report and Written Opinion, PCT Application No. PCT/US2016/030467, dated Sep. 13, 2016, 23 pages.
U.S. Appl. No. 15/710,778 Office Action dated Dec. 18, 2017.
U.S. Appl. No. 15/143,407 Office Action dated Mar. 27, 2018.
U.S. Appl. No. 15/710,778 Office Action dated Apr. 20, 2018.
U.S. Appl. No. 15/143,407 Final Office Action dated Dec. 7, 2108.
U.S. Appl. No. 15/143,391 Final Office Action dated Jan. 24, 2019.

* cited by examiner

PERSONAL FOOD INVENTORY-BASED TRACKING

RELATED APPLICATIONS

This application claims priority to of U.S. Provisional Application No. 62/162,482, filed May 15, 2015, U.S. Provisional Application No. 62/162,490, filed May 15, 2015, U.S. Provisional Application No. 62/162,493, filed May 15, 2015, and U.S. Provisional Application No. 62/162,497, filed May 15, 2015, all of which are incorporated by reference in their entirety.

FIELDS OF CLASSIFICATION

U.S Classes 235/385, 437/127, 707/740, 707/802, 709/206.

BACKGROUND

In the United States, 33.79 million tons of food went wasted in 2010, at a retail equivalent of $161.6 billion. On a global scale, it is estimated that 4 billion tons of food is wasted each year, the U.S. per capita waste has increased 50% since 1974. Discarded food represents the single largest component of municipal solid waste reaching landfills, and it is estimated that 30-50% of food from supermarkets is thrown away in the homes of people who purchase it.

Much of the food that is wasted is a result of people simply not knowing what food they have in their pantries and refrigerators, or not using it before the food goes bad. Since most households have hundreds if not thousands of food items, it is difficult for people to keep track of what items they have, how long they have had them, and when they will expire. In addition, many people buy items at the grocery store that they do not need because they do not realize that they have the item at home already and they don't have an easy way to check their inventory.

In addition, often people have plenty of food items in their household inventory, but cannot easily come up with recipes that use just the ingredients they already have. Today's consumers have many different dietary concerns as well, from wanting to eat a low carbohydrate diet to food allergies, and prefer to cook items that meet those concerns.

SUMMARY

A personal food inventory system (PFIS) allows for storage of food items in a personal inventory associated with a user account, as well as tracking of food items consumed by the user account. The PFIS includes food records for each food item in the personal inventory, as well as various information about the food items. The PFIS is linked to an application for communicating between an account user and the PFIS items that are received into the personal inventory and items consumed or otherwise removed from the personal inventory. The PFIS is linked to one or more preferred vendors for easy entry of items into the personal inventory. The PFIS maintains up to date records of quantities of each food item.

The PFIS also provides recommendations of dishes the account user can prepare based on the personal food inventory and/or a vendor inventory associated with the preferred vendor. The PFIS stores dish records including food item identifiers for ingredients in the dish, and upon request, determines a set of candidate dishes for recommendation to the user based on the inventories. The candidate dishes are filtered and ranked according to various user-supplied criteria, and are presented to the user via the application.

The PFIS further provides user notifications for items nearing their expiry date. The PFIS stores freshness information about food items in the personal inventory, calculates freshness days remaining, and provides the account user a notification identifying any food items approaching their expiry date base on the freshness information.

The PFIS also provides notifications to the account user regarding usage of the personal food inventory system by tracking consumption. The account user can provide one or more consumption goals, the system can determining one or more consumption trends, and the PFIS can provide the account user notifications via the application. Goals the PFIS can track include nutrition-based goals, economic, and recycling goals.

FIGURES

DETAILED DESCRIPTION

System Architecture

Figure 1:
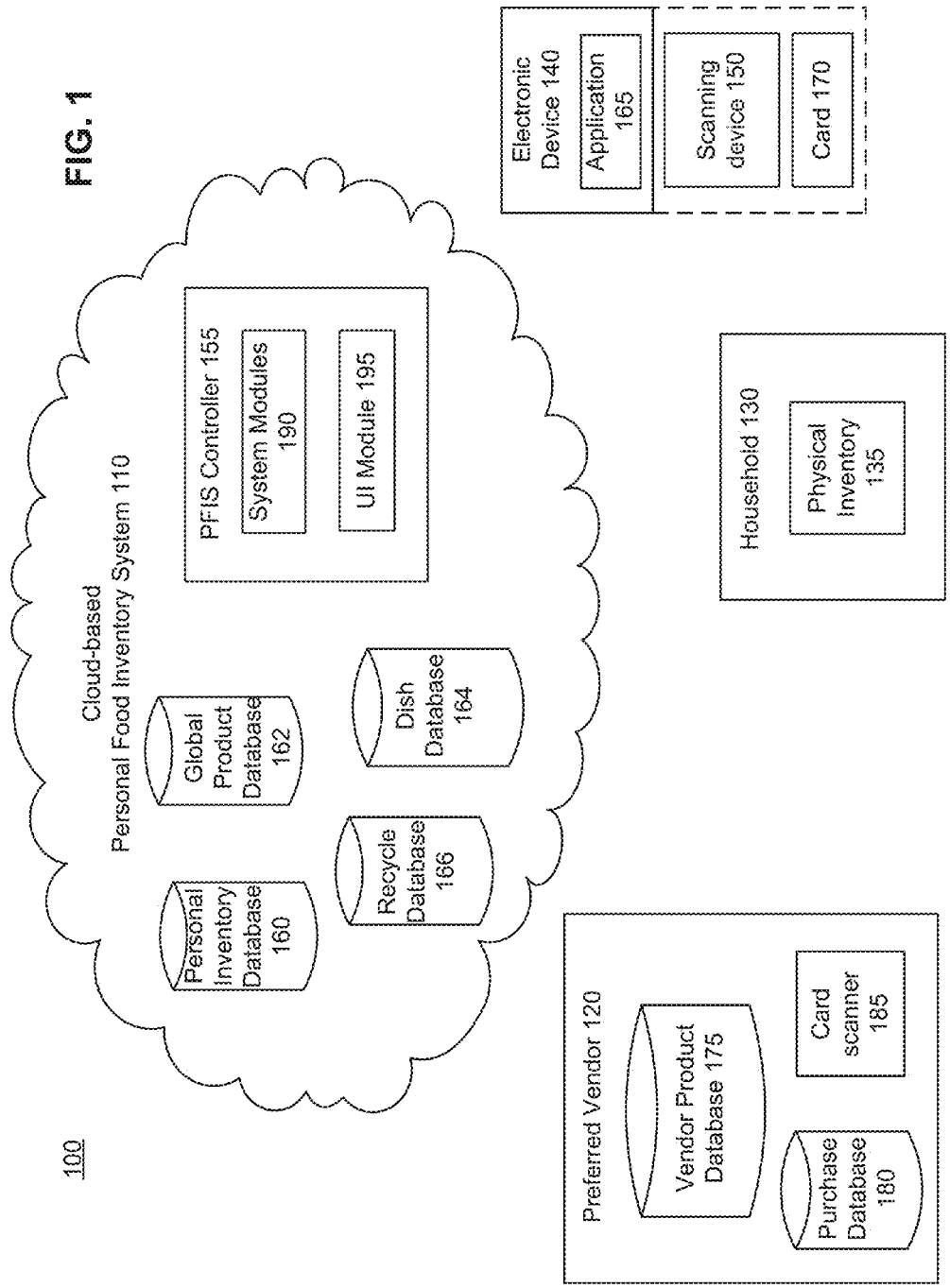
FIG. 1 is a high level entity diagram for a food inventory-based tracking and recommendation system according to one embodiment.

FIG. 1 is a high level entity diagram for a food inventory-based tracking and recommendation system 100 according to one embodiment. The personal food inventory system 100 includes, according to one embodiment, a cloud-based person food inventory system 110, one or more preferred vendors 120, a household 130 corresponding to an account, and at least one electronic device 140 for the household. The entities are electronically connected over a network according to one embodiment. The person food inventory system 110 is preferably disposed remotely from the vendor system 120, household 130, and electronic device 140.

A cloud-based personal food inventory system (PFIS) 110 controls a system and method for maintaining a personal food inventory, recommending dishes based on the personal food inventory, providing notification of items nearing their expiry date, and providing user notification regarding usage of the personal food inventory system.

One or more preferred vendors 120 also participate in the system, by selling food items for purchase by system users, transmitting messages regarding transaction history, and providing food item information for items purchased. The one or more preferred vendors 120 are "preferred" with respect to a specific user account, and are specified by the user during the account set up process. Other specifics are included as part of set up according to one embodiment, for example, providing information about appliances available for use in food preparation, etc. Although only one preferred vendor 120 is shown, more than one can be selected by the user during account set up, or even added or modified later.

A household 130 is represented by a single account in the PFIS 110. The household is the entity for which a personal inventory is kept, goals and trends are measured, and for which recommendations are made. A household may include a single user or may link to multiple different users, but typically is understood as associated with an actual, physical household.

An electronic device 140 can be a mobile phone, laptop computer, tablet, desktop computer, etc. Embodiments of electronic devices, user interfaces for such devices, and associated processes for using such devices are described. In some embodiments, the device is a portable communications device, such as a mobile telephone, that also contains other functions, such as PDA and/or music player functions. Portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad). The electronic device 140 is used by a user of the PFIS 110 who has an associated account. According to one embodiment, the device 140 has voice recognition functionality that allows the user to easily remove items from the personal inventory by speaking that a particular food item has been consumed.

The PFIS 110 includes several databases 160-166 and a PFIS controller 155 according to one embodiment. Each database is implemented using a database management system and a data storage device; the database management system is a relational database management system, and the data storage device is a disk or solid state storage device. A personal inventory database 160 stores a personal food inventory associated with an account for a user of an electronic device 140, and includes information specific to the account. The personal inventory database 160 includes various tables to store a personal user inventory, food item information, dishes and recipes, recycling availability information, food item consumption information, and other food item tracking information specific to the associated account.

The personal inventory database 160 includes the following tables according to one embodiment: an account table that is specific to an individual account, and includes stored information such as household members, user names and passwords, preferred vendor information, etc. The database 160 also may have a user table, specifying which user or users are associated with the household account.

The database 160 also may have a food inventory table that maps each account to a food inventory, a list of food identifiers, and various food attributes. The personal food inventory for the account includes food records that each have a description of a food item and a food item identifier. A "food item," as used herein, refers to a single food or ingredient. For example, a food item could be chicken, or mustard, or carrots, or black pepper. Each food item is an entry in a table associated with the personal food inventory for the account. For example, food information for food items in the food inventory table ("food inventory" herein) can include: a record number, a FoodID, a food description, various nutritional attributes, inventory quantity, consumption quantity, consumption units, consumption date, consumption source, vendor ID, transaction ID, vendor item ID, vendor account ID, purchase quantity, purchase date, item cost/purchase price, freshness start date, freshness expiry date, freshness days left, and freshness threshold. In other embodiments the possible food item information may be less or more than what is listed here, and may model known food data tables. See, e.g., USDA National Nutrient Database for Standard Reference, Release 27.

The global product database 162 includes all food items known to the PFIS 110, including food items across all of the plurality of accounts for the various users. The global product database 162 includes the following tables: food item table with the individual items listed, with a key corresponding to the unique FoodID. The global product database 162 also includes a food nutrition table, with nutrition data for fixed set of nutrients, keyed by FoodID. Because the global product database 162 spans multiple accounts, if food item information is not available in the person inventory database 160, the global product database 162 can be used to look up the information.

The dish database 164 includes the following tables: dish table that includes information about a prepared food item. Dish database 164 also includes a list of <FoodID, measure> for each food in the dish and instructions, with each dish also having its own DishID. The dish database 164 also has a meal table, with a list of DishIDs. The dish database 164 also has a meal plan table, with a list of <MealID, day/time>, and each has MealPlanID. The dish database 164 also may include information about appliances needed to make the dish.

The recycling database 166 may include information on recycling options local to the account user. The recycling database 166 may include information as to how to recycle items not accepted by the standard recycling in the area local to the account user. The PFIS controller 155 is described in greater detail in conjunction with FIG. 2.

The preferred vendor 120 includes a vendor product database 175, a purchase database 180, and a card scanner 185 according to one embodiment. The vendor product database 175 includes every food item that the preferred vendor 120 sells, and includes detailed information about each of those products, similar to the information listed above for the personal inventory database 160, but at the preferred vendor 120 level. The preferred vendor product database 175 also may tie each food item to a bar code, QR code, vendor product code, or the like to help identify the unique food item in the vendor product database 175. The purchase database 180 tracks all purchases made at the preferred vendor 120, with each transaction having a number, as well as information about each of the food items purchased, prices, date of purchase, etc. The card scanner 185 is a device located at the preferred vendor 120 that allows a user to scan an associated card 170 that identifies the user as belonging to the respective PFIS account. The user may scan the card 170 at the card scanner 185 at the point of sale, for example.

The household 130 is the group of users associated with the account, and houses the physical inventory 135 according to one embodiment. The physical inventory 135 includes the physical food items tracked by the personal inventory associated with the account for the household 130.

One or more electronic devices 140 are used by the account user, and run application 165 for allowing the user to interact with the PFIS 110. The application 165 is provided to the electronic device 165 either directly from the PFIS 110, or indirectly from another online source, such as an application store which received the application from the PFIS 110; in either case the application 165 is downloaded to the electronic device 140 for execution thereon; the application 165 may also be provided as a natively installed application in the electronic device 140. The one or more electronic devices 140 optionally may include a scanning device 150 (or camera), and an electronic version of a card 170. Alternatively, the user of the device 140 may have a physical card 170. The account user uses the scanning device 150 or camera of the device 140 to capture bar code or other food item identifying information for entering or removing food items from the account's personal inventory.

The application 165 provides the interface between the account user and the PFIS 110 for all aspects of system functionality. For example, the application 165 provides all of the user interfaces described herein, for example as shown in FIGS. 5, 6A, 6B, 8, and 10. The application 165 allows the account user to communicate with the PFIS 110, enter items into inventory for the account associated with the user, remove items from inventory, get dish recommendations, provide user notifications, reporting functions, and the like. As a part of an initial system set up, a user may enter all of the food items in the physical inventory 135 for their household 130 into the PFIS 110 via application 165. The application 165 may provide various search, scan, and other capabilities to help ease the user's burden in this initial data entry. The application 165 facilitates all of the user-facing functionality described herein. The application 165 also may request information form the account user to assist in communicating notifications, etc., such as an account user's email address, cell phone number, or other contact information. In addition, as part of account set up, each account user is issued a card 170, that is associated with the user's account. The card 170 will be scanned at a card scanner (e.g., 185) at the vendor 120 to identify the user as a user associated with the account. Using the account information from the scanned card 170, the card scanner 185 is configured to transmit to the PFIS 110 transaction information including information about the purchased food items.

Figure 2:
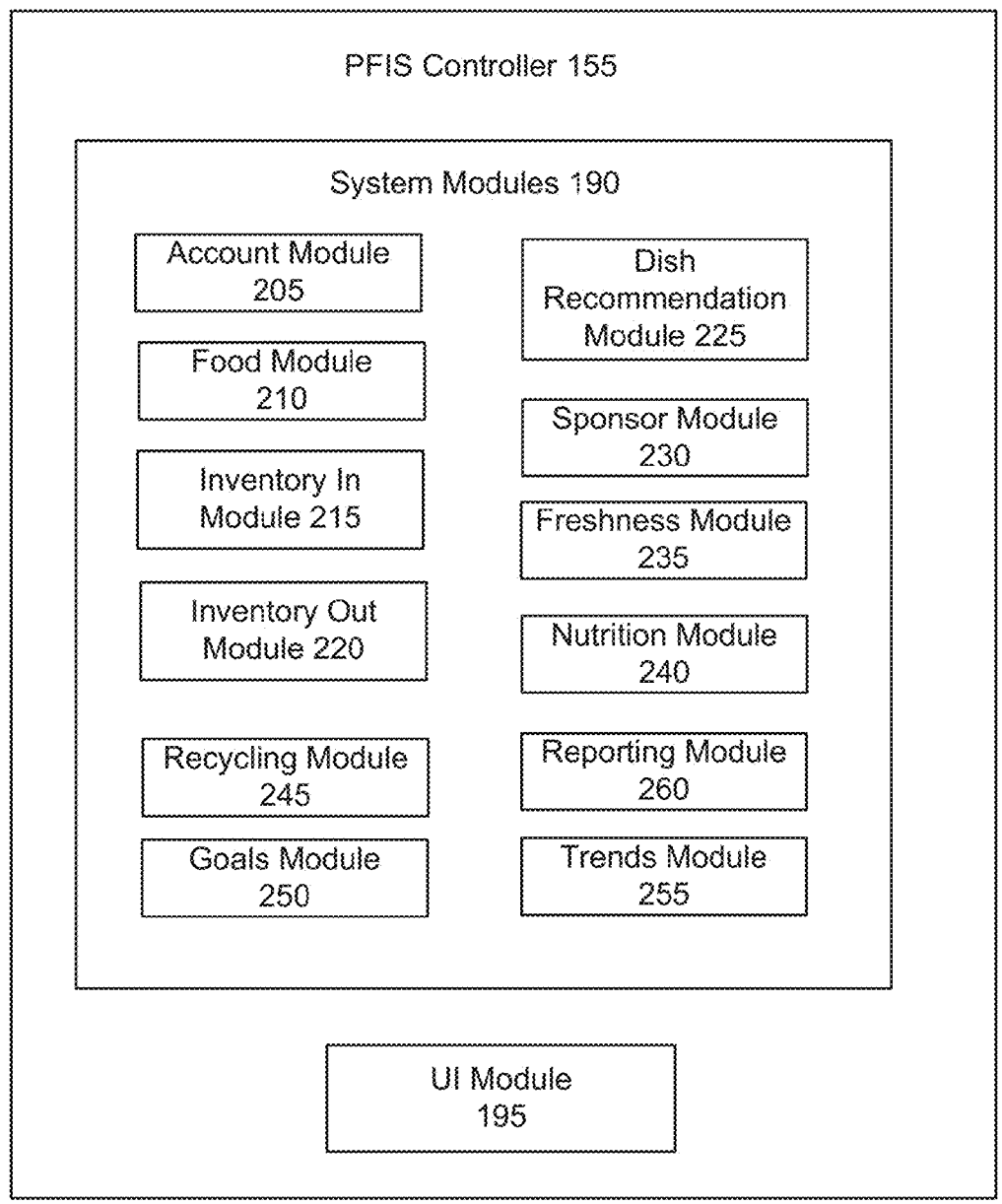
FIG. 2 depicts a system architecture of a personal food inventory system controller according to one embodiment.

FIG. 2 is a system architecture of a PFIS controller 155 according to one embodiment.

The PFIS controller 155 controls the functionality of the PFIS 110, and is one means for so doing. The PFIS controller 155 includes system modules 190 and UI module 195. The system modules include the following modules, according to one embodiment. The modules are implemented as computer code executed by a processor. As appreciated by those of skill in the art, the operations and functions of the modules are necessarily executed by a computer, and are not performed by mental steps in the human mind in any practical embodiment.

An account module 205 tracks various user accounts with the PFIS 110, and as data is received routes inventory information to the appropriate personal inventory associated with the account.

A food module 210 receives and tracks individual food items, and associates food item identifiers with the food items for storage in the personal inventory database or product database 162, and is one means for so doing. If needed, the food module 210 can look up food item information from various sources for populating the databases 160-166.

An inventory in module 215 receives and tracks a plurality of food item identifiers of food items purchased or otherwise received by an account user and a quantity of each food item for entry into the personal inventory for the account and updates the inventory, and is one means for so doing. All functions described herein as associated with inventory into the personal inventory are controlled by the inventory in module 215.

An inventory out module 220 receives a notification that at least a portion of a food item associated with the account has been consumed and a quantity, and updates the personal inventory, and is one means for so doing. All functions described herein as associated with inventory out of the personal inventory are controlled by the inventory out module 220.

A dish recommendation module 225 determines a set of candidate dishes from the dish database with ingredients comprising specified food items, ranks the set of candidate dishes based on various factors, and selects one or more dishes for display to the account user, and is one means for so doing. All functions described herein as associated with recommending dishes to account users is controlled by the dish recommendation module 225.

A sponsor module 230 allows for promotion of specific brands or products based on an advertising or sponsorship model in which vendors and/or food item suppliers can sponsor items for more prominent display in various interfaces of the application 65, and is one means fore so doing. All functions described herein as associated with sponsorship are controlled by the sponsor module 230.

A freshness module 235 calculates freshness days remaining for food items, determines food items in the personal food inventory with expiry approaching, and provides notifications to the account user of the expiring items, and is one means for so doing. All functions described herein as associated with freshness dates, spoilage, and expiration of food items are controlled by the freshness module 235.

A nutrition module 240 provides and retrieves nutrition information, information corresponding to nutrition-based consumption goals, and accepted nutritional guidelines for use within the system, and is one means for so doing. Nutrition may be used, for example, for the reporting functions described in conjunction with FIG. 9. All functions described herein as associated with nutrition are controlled by the nutrition module 240.

A recycling module 245 retrieves and provides recycling information, e.g., for storage in recycling database 166, and is one means for so doing. The information may include information on recycling options local to the account user, and/or information as to how to recycle items not accepted by the standard recycling in the area local to the account user. All functions described herein as associated with recycling are controlled by the recycling module 245.

A goals module 250 tracks consumption goals associated with user accounts, and is one means for so doing. Consumption goals can be nutrition based, such as keeping overall fat content of the food items consumed to 25% or below, or can be based on various non-nutrition goals such as low food wastage, lowest cost items, etc. All functions described herein as associated with goals are controlled by the goals module 250. A trends module 255 tracks trends of consumption of food items by the account user, and is one means for so doing. All functions described herein as associated with trends are controlled by the trends module 255.

A reporting module 260 provides reporting functions for the data stored by the PFIS 110 and provides notification based on, e.g., consumption goals and trends or patterns of consumption of food items, and is one means for so doing. Various reporting options are available via the application 165, as described in conjunction with FIGS. 9 and 10. All functions described herein as associated with reporting are controlled by the reporting module 260.

A user interface (UI) module 195 controls the various user interfaces of the application 165, and is one means for so doing. The UI module 195 converts data from the PFIS 110 for display to the user, and communicates user input in the application 165 back to the PFIS 110. All functions described herein as associated with user interfaces for the application 165 are controlled by the UI module 195.

The modules described herein are merely exemplary, and more or fewer modules, or modules in other arrangements can be used in other embodiments.

Process Flow

Figure 3:
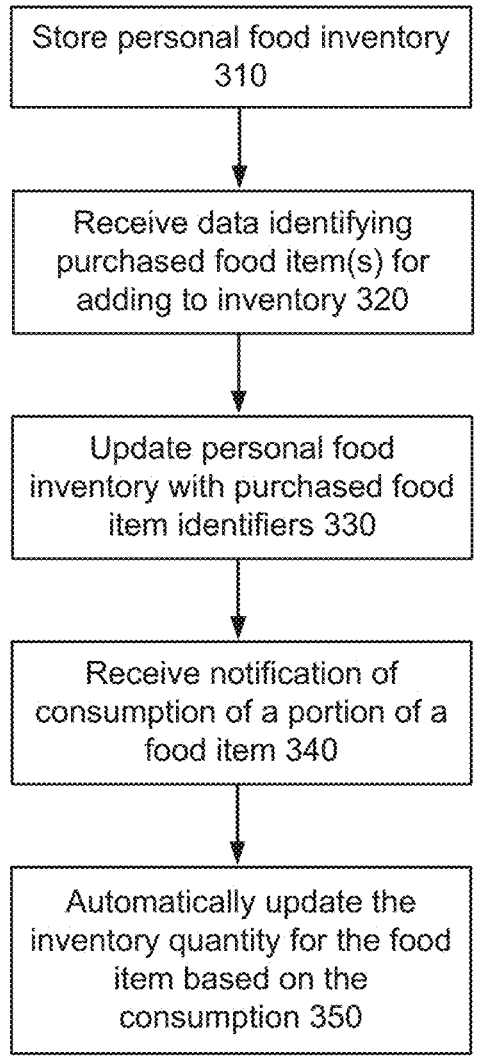
FIG. 3 is a flowchart depicting a computer executed method of maintaining a personal food inventory according to one embodiment.

FIG. 3 is a flowchart depicting a computer executed method of maintaining a personal food inventory according to one embodiment. The method is executed by a cloud-based personal food inventory system (PFIS) 110. The method starts with storing 310 in the personal inventory database 160 a personal food inventory associated with an account for a user of an electronic device, e.g., device 140. The database 160 is configured as described above with the various tables 160-166 to store a personal food inventory, food item information, dishes that can be made from the food items, and recycling option information. In one embodiment, an account can be linked to multiple users and devices. For example, the account can be associated with a household, and each device associated with the household can be linked to the account. The personal food inventory can be stored, for example, in a personal inventory database 160.

Continuing with the example of a household, the personal inventory database 160 for a household, e.g., 130, could include all of the food items included in the physical inventory, e.g., 135, of the household 130 and associated with the household. For example, the physical inventory 135 of a household 130 is every food item physically present in the household. As a part of an initial system set up, a user may enter all of the food items in the physical inventory 135 for their household 130 into the PFIS 110, e.g., via application 165. The application 165 may provide various search, scan, and other capabilities to help ease the user's burden in this initial data entry. Alternatively, upon start up a user may chose not to enter current items in physical inventory, but rather start using the system as described herein, and adding food items in physical inventory as they become relevant to the function being used, such that the personal inventory database 160 becomes more accurate over time. For example, when a user goes shopping, new food items get added into the physical inventory 135 and the personal inventory. When a user consumes a dish, the user may update items consumed from physical inventory 135 that were not yet in the personal inventory. For example, the application 165 could display: "You appear to have eaten more apples than you had in inventory. Your inventory said 0 apples, and you ate 1. Is that correct?" Following such entry, the apple previously not in the personal inventory would be added, and then removed and marked as consumed.

The personal food inventory for the account includes food records that each have a description of a food item and a food item identifier. A "food item," as used herein, refers to a single food or ingredient. For example, a food item could be chicken, or mustard, or carrots, or black pepper. The food items that make up a food or dish are also known as the ingredients of the dish.

In one embodiment, the personal food inventory may include other information associated with each food record, such as various attributes of the food such as nutrition information, recyclable packing information, etc., quantity in inventory and quantity consumed, vendor information regarding the source of the food item, freshness and/or expiration information, and the like, as described above.

Next, a plurality of food item identifiers of food items for input into the personal inventory are received 320. The food items are added to the personal food inventory associated with the account.

The receipt of food item identifiers at the PFIS 110 can occur in a variety of ways, and the PFIS 110 supports inputs from a number of different sources. As expected, many users will purchase food items at retail stores. Each user is issued a card 170, which is associated with the user's account. The card 170 could have a bar code or magnetic stripe, or both, identifying the user's account. The card 170 is scanned at a card scanner (e.g., 185) at the vendor 120 to identify the user as a user associated with the account. Using the account information from the scanned card 170, the card scanner 185 is configure to transmit to the PFIS 110 a list of the purchased food items and quantity purchased directly For example, a message format for transmitting the purchased information, can take the following form:

```
<?XML version=1.0 encoding ="utf-8?>
  <Header>
  <MessageID>{1234}</MessageID>
  <Action>httpd://pfis.com/UpdateFoodInventory</Action>
  <UserAccount>9845323</UserAccount>
  </Header>
  <Body>
  <Vendor>349095</Vendor>
  <PurchaseDate>04-14-15</PurchaseDate>
  <FoodList>
      <food foodid="3939" quantity="1"></food>
      <food foodid="345332" quantity="2"></food>
  </FoodList>
  </Body>
  </Message>
```

The PFIS 110 receives the list of food items, along with the account identifier and adds the corresponding food items, food item identifiers, quantity, and all other information received about the food item to the personal inventory database 160.

In the example of an online vendor 120, a similar process is used in one embodiment, except that a card is not scanned. Instead an account number, user name and password combination, or the like is used by the vendor payment processing system to identify the user as associated with the account, received via a point of sale device. Once identified, the vendor payment processing system transmits the food item information for the items purchased to the PFIS 110 via the previously described API. In another embodiment, the information may not be sent to the PFIS 110 automatically. For example, the vendor 120 may instead provide the information upon a request that includes the identifying account information. The request could be immediate, such as a request by the electronic device 140 at the vendor 120, causing the vendor to push the information to the electronic device 140, or could be later in time, upon a request with identifying transaction information for the purchase. For example, a user could request the food item information be provided by identifying to the vendor 120 a transaction identifier, and the vendor in turn could provide all the information associated with the transaction, including vendor item identifiers for each food item, a purchase quantity, a purchase date, etc. In some instances the vendor 120 may provide partial information and allow the PFIS 110 to access a vendor product database 175 that includes additional information about the purchased food items.

In yet another embodiment, the food item information could be received for an item taken out of inventory 340 of the PFIS 110 via an application 165 with an account for the user (or put into 320 inventory). In this example, the application 165 displays to the user the personal inventory, and the user can select an item consumed and how much, and that is sent to the PFIS 110 for updating the personal inventory. In some instances the system may recommend automatically removing items, e.g., because they are expired, and the PFIS 110 creates a list of these items as candidates to be removed, and displays this list to the user to confirm whether the items should in fact be removed.

Another way that items can be received into or out of inventory is via use of a scanner device (e.g., scanning device 150), e.g., at the location of his or her physical inventory 135. The scanner 150 would capture a bar code, QR code, or other item identifying code, communicate that to the application 165 to identify the associated food item and identifier, in order to identify the product consumed. In one embodiment, the card can be chip-enabled, and the scanner 150 or device 140 can read the chip-enabled card. The user could then input the quantity consumed (or added), either via the scanning device 150 itself or via the application 165. For any items that may not have bar codes, the manual entry described above could be used, e.g., in conjunction with an item look up for items commonly sold without bar codes, such as fresh fruits and vegetables. Alternatively, a mobile device (e.g., 140) could be equipped with the ability to use a camera on the device 140 to capture the item information and perform the functions described above as being performed by the scanner 150, instead of using a separate scanner. In either input scenario, the user inputs the food item by scanning or otherwise capturing information identifying the food item, e.g., a bar code, QR code, SKU number, or other machine-readable identifier of the product. These machine readable identifiers are then transmitted from the capture device to the PFIS 110. An example message format is as follows:

```
<?XML version=1.0 encoding ="utf-8?>
<Header>
    <MessageId>{4321}</MessageID>
    <Action>httpd://pfis.com/UpdateFoodInventory</Action>
    <UserAccount>9845323</UserAccount>
</Header>
<Body>
<ConsumeDate>04-15-15</ConsumeDate>
<FoodList>
```

-continued

```
    <food foodid="3999" quantity="-1"></food>
    <food foodid="343532" quantity="-0.5"></food>
</FoodList>
</Body>
</Message>
```

Once received, the PFIS 110 stores the food item information that is specific to the personal inventory for the account in a personal inventory database (e.g., 160), and may additionally store general food item information in a global product database (e.g., 162) corresponding to products across multiple users.

Once received, the personal inventory database is updated 330 with the received plurality of food item identifiers and purchase quantities for each food item received for the personal food inventory associated with the account, along with their associated purchase dates. For example, if an item was not previously in inventory, the new quantity received would be the updated quantity. However, if the account lists existing inventory of a food item, once the purchased items are received then the quantity of the item would be updated to reflect the prior amount plus the purchased amount. As noted above, when there is more than one of the same item in inventory, the PFIS 110 may work on a FIFO system that monitors only the oldest item, or may maintain separate food item identifiers for the items according to their different purchase or expiration dates, or other distinguishing attributes. If any information about the food item is missing from the information received from the vendor 120, e.g., if the vendor lacked nutritional information or the like, the food item could be cross-checked against the global product database (e.g., 162) to see whether the global product database 162 has any additional information about the food item. Since the global product database 162 tracks items across multiple users, additional information about the food item may be available beyond that received form a particular vendor 120. The process of updating 330 the personal inventory database can repeat each time items are added or remove from inventory At some later point, a notification is received 340 at the PFIS that at least a portion of a food item associated with the account has been consumed, or has expired. The notification includes the food item identifier associated with the consumed item and a consumption quantity. For example, a user associated with an account provides information that an item has been consumed, e.g., by providing item information and providing a consumption quantity. In one embodiment the user uses the application 165 to notify the PFIS 110 that a food item has been consumed. For example, the application 165 may have an interface for the account user to provide information about one or more consumed food items, such as food item, quantity or amount consumed, storage of remaining portion (e.g., for items requiring refrigeration). The user will need to inform the system if the food item is spoiled (e.g., and thrown away) rather than consumed (e.g., eaten) for proper tracking.

Again a scanner 150 or other electronic device 140 could be used to capture information about the food product being removed from the personal inventory, or the item can be identified via the application 165. In another embodiment, an automatic removal from inventory could be used for items that pass an expiry data for items known to the PFIS 110. In this example, once an item expires it is flagged for removal from inventory automatically, upon user confirmation.

The message passed to the PFIS 110 by the application 165 could follow the format above for removing items from inventory. In addition, the PFIS 110 may need to authenticate the sender of the message, e.g., by verifying the device 140 from which the message originated, verifying account privileges (e.g., which members of a household 130 can modify an account, etc.). Next, the PFIS 110 traverses the message, e.g., to check whether this update is not already conflicted by another user of the account in a recent, predetermined timeframe (e.g., 10 minutes). The PFIS 110 may start by identifying the last update to the account, and if it is within the window (10 minutes) then compare the items included in the update. If some of the items match (i.e., the same item is updated by two users of the account), the PFIS 110 checks for redundant entry by asking the second entering user "User A just told us that the bananas were used. Is this the same update as User A's?" If so, the PFIS 110 doesn't update that item. If not, then the PFIS 110 does update the item. If the update is received longer ago than the predetermined timeframe, then the PFIS 110 assumes that the update is new.

Then, for each item the PFIS 110 checks the personal inventory quantity, and subtracts from it the consumption quantity. If the personal inventory number is reduced to zero, the application 165 confirms that to the user: "You have used all of the Bananas. Is that right?" In this way, the application 165 and PFIS 110 work together to validate the inventory update. If the number consumed brings the total to below zero, there's problem. The application 165 could display: "You appear to have eaten more apples than you had in inventory. Your inventory said 2 apples, and you ate 3. Is that correct?" The user then could select a Yes answer, or a No answer, stating that the update was an error, and input the corrected consumption or inventory quantity. If the update to the personal inventory is verified, then the consumed item is added to the information about food items consumed.

In yet another embodiment, the notification received 340 may be based on a dish being prepared and/or consumed that includes various food items. In this example, the user may provide the information identifying the dish, e.g., via selection from dishes previously recommended, and the system can match up the food items associated with the dish for processing the associated portion(s) of food item(s) consumed. The PFIS 110 can then have the user confirm the food items, e.g., by asking: "Did you make this dish with all of the following ingredients?", with a list of food items with checkboxes pre-checked. The user can then confirm or remove (uncheck) an item. If an ingredient in the list was not used, the system flags it and asks if it was skipped or substituted. If substituted, the system gives the user a way to select a substitute. The system also may allow the user to add an item, and confirm the added item. Once this step is complete, the Dish ID can be sent to the PFIS 110 to update the personal inventory for the corresponding food items.

In response to receiving the notification, the PFIS 110 system automatically updates 350 the inventory quantity of the food item associated with the received identifier in the personal food inventory associated with the account based on the consumption quantity. The system also stores the updated inventory quantity of the food item in the food record of the food item. In conjunction with storing the current inventory information, in one embodiment the system also may store the current and historical consumption quantities and other information.

If the notification is received 340 at the PFIS 110 that a food item associated with the account has been fully consumed (e.g., either because the user communicates that all was consumed or the inventory quantity minus consumption quantity is zero), in addition to the user confirmation step above, the PFIS 110 prompts the user with recycling information according to one embodiment. For example, if a user finishes a carton of milk, the system can provide information as to the ability of the carton to be recycled in the user's standard recycling bin according to local recycling procedures associated with the locale of the user's household 130. For example, the user may have entered location information upon set up of the account with the PFIS 110, and the recycle database 166 may include information on local recycling in this example. In addition, if the item is not compatible with the standard local recycling program, the PFIS 110 can provide the user information as to how to recycle the carton nearby, and also provide a notification mechanism for whether the item was recycled or not. This data is added to the personal inventory database long with other consumption information, to use in reporting features regarding recycling goals and the like, e.g., as described in conjunction with FIG. 9 below.

The stored information regarding purchase quantities, consumption information, recyclable/recycled packaging materials, and the like can be gathered and used for various reporting functions and to make recommendations to the users regarding, e.g., how well the actual consumption for the account measured up to nutritional goals for the account, as further described in conjunction with FIGS. 9 and 10 below. In addition to nutrition-based reporting and functionality, the reporting can provide information such as spending statistics for purchases made, allergen information regarding the ingredients of food consumed, information about how much of the food item packaging was recyclable, etc. Reporting is discussed further below in conjunction with FIG. 9.

Figure 4:
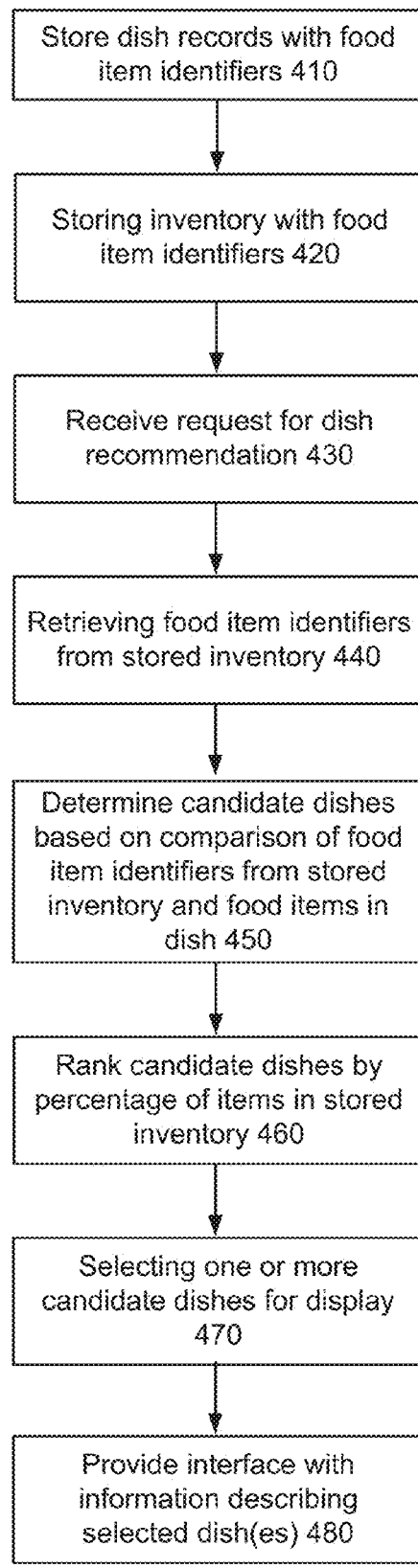
FIG. 4 is a flowchart depicting a computer executed method of recommending dishes based on a food inventory according to one embodiment.

FIG. 4 is a flowchart depicting a computer executed method of recommending dishes based on a food inventory according to one embodiment. According to the method, a plurality of dish records corresponding to dishes are stored 410 in a dish database, e.g., 164. Each dish record includes a list of food item identifiers of food items included in the dish. A "dish," as used herein, could be an entrée, an appetizer, a side dish, or other food portion. Typically a dish is a food portion corresponding to a recipe. For example, a meal may be comprised of multiple dishes, each of which would have their own recipe. Thus, for each of the food items included in the dish, i.e., the ingredients in the dish, the dish records would provide food item identifiers. The dish database 164 may be pre-loaded with various recipes, but also may allow the user to add their own recipes to the dish database 164, including making them available to other PFIS 110 users, if desired. For example, if a user wants to add a specific dish to the dish database 164, the application 165 may provide an interface for doing so, including providing prompts for information about the recipe and whether to make it public or keep it private. Dishes made public are added to the dish database 164 that any user can access. In one embodiment, the application 165 includes a recipe lookup function.

In addition, one or more food inventories are stored 420. The food inventories may be personal, or associated with a preferred vendor, or drawn from a combination of both. As described above, the preferred vendor can be more than one vendor according to one embodiment, if the account user has selected more than one preferred vendor.

According to one embodiment, a personal food inventory associated with an account for a user of an electronic device is stored in a personal inventory database as described above. As described above, the personal food inventory may corresponding to a physical inventory 135 of items associated with a user or household, according to one embodiment. According to another embodiment, one or more preferred vendors for an account for a user of an electronic device are stored, and a vendor inventory associated with the one or more preferred vendors for the account are accessible by the PFIS 110. For example, if User A lives in a small town, the user may set the preferred vendor as the local market, and may want to have the system consider the availability of items at the local market in making recommendations to the user. The vendor inventory corresponds to a physical inventory associated with a preferred vendor 120, e.g., a particular retailer, store location, or warehouse that houses inventory for the particular preferred vendor 120. In the case of a vendor 120 database, the user will want to apply one or more filters to the dish recommendations, as described below. In the personal food inventory and/or the vendor inventory, a plurality of food records are stored, and each food record includes a food item identifier and information describing a food item associated with the food item identifier as described above.

According to the method, a request from the user for a dish recommendation is received 430, e.g., via a user interface associated with an application 165. According to one embodiment, a user interface for the application 165 can be viewed on a mobile device, e.g., electronic device 140, or on any other computing device. The request may be received 430 with various filters or criteria to apply, such as calories, fat, carbohydrate limits or other nutritional parameters, avoidance of particular food items for food allergens, intolerances, or other food exclusions, cost information, availability in either or both of the personal or preferred vendor inventories, constraints on the recyclability of the food item packaging, preparation time, freshness information of current personal inventory items, number of dishes or servings desired, whether to include dishes included in prior recommendations, or other criteria for the requested dish or dishes. In this way, the user can request a dish or dishes that are highly customized based on the user's particular needs, limitations, and desires for the dish or dishes.

Figure 5:
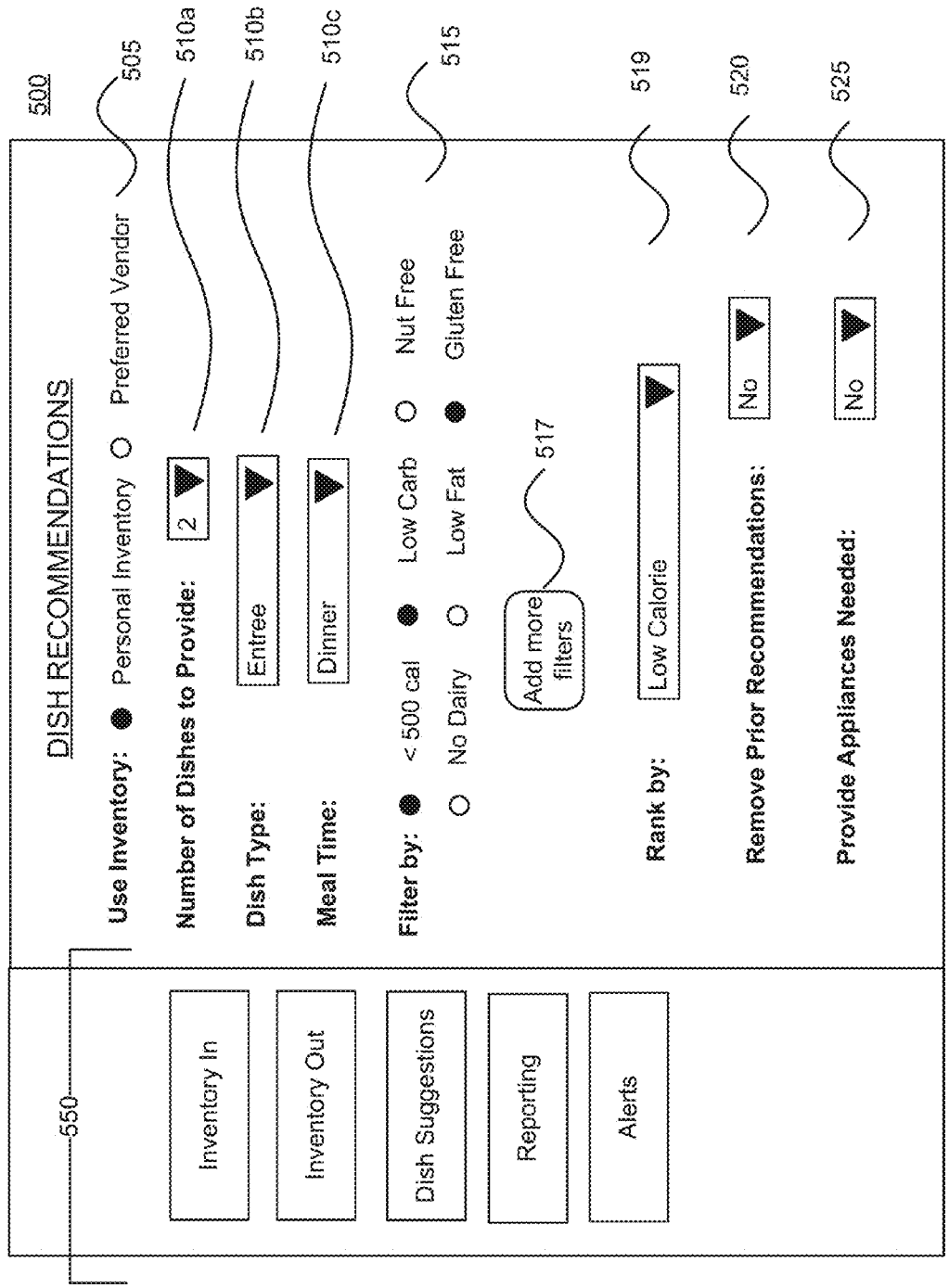
FIG. 5 illustrates an example of a user interface for receiving a request for a dish according to one embodiment.

FIG. 5 illustrates an example of a user interface 500 for receiving such a request according to one embodiment. In this example, the user interface 500 includes a radio selector 505 for whether to use a personal and/or vendor inventory as the basis for the dish recommendations; a number of dishes to provide as recommendations dropdown 510*a*, a dish type as dropdown 510*b*, and a meal time as dropdown 510*c*. Other dropdowns could be used to help select the dish, e.g., type of cuisine (Chinese, Italian, etc.), preparation time, etc. Various filters 515 also can be applied. Here, six options are shown: <500 calories, low carbohydrates, nut free, no dairy, low fat, and gluten free. Other filters can apply according to various configurations of the user interface 500, such as other areas of nutrition, various food avoidance parameters, freshness considerations, availability of item at local store, etc. An add more filters button 517 is selectable to allow the user to add additional filters if greater than those displayed are desired, for example. Alternatively, the user can set which filters to allow as radio buttons during the initial system set up. In addition to the filters 515, the user can select by what criterion (or criteria) to rank the filtered dishes, via dropdown 519. One ranking criterion 519 is shown, however, additional criteria could be applied by the user, customized to weight them according to user preference. Other examples of ranking criteria 519 include cost (with lower cost items ranked higher) and popularity of the dish (e.g., star ratings on a 1 to 10 scale among the recipes). A prior recommendation exclusion dropdown 520 and/or a provide appliances needed dropdown 525 are provided in some embodiments. In the user interface 500 shown in FIG. 5, a side panel 550 provides a set of other selectable aspects of the application 165 related to other user interfaces within the application 165. More or fewer filters and criteria 505-525 to apply to the dish request can be used according to other embodiments. In another example, the personal or vendor food inventory radio buttons 505 are omitted and the inventory that the food items for the dish will be selected based on is chosen by the user separately from the user interface 500, e.g., as a setting or default for the user interface 500. Other criteria also can be applied that are not user-selected, for example promotion of specific brands or products based on an advertising or sponsorship model.

Returning to FIG. 4, next a plurality of food item identifiers are retrieved 440 corresponding to a plurality of food records, either from the personal inventory database associated with the user's account, and/or from the vendor database, e.g., depending on the radio selector 505 if present. The plurality of food item identifiers retrieved 440 are selected based on the filters and criteria 505-525 applied, according to one embodiment. According to one embodiment, the vendor database 175 is accessed directly by the system at the time of the request 430 to ascertain availability of food items in the vendor database 175. In other embodiments, availability of the items in the vendor database 175 is retrieved periodically and stored in the global product database 162 until requested. According to one embodiment, the system maps between food items and specific brands of the item available at the preferred vendor 120.

Next a set of candidate dishes from the dish database are determined 450 that include as ingredients the food items associated with the retrieved food item identifiers. For example, by comparing the retrieved food item identifiers with food item identifiers included in the dishes in the dish database and a quantity of the food item in the dish, a set of best match dishes for the retrieved 440 food item identifiers can be determined. In the example shown in FIG. 5, the dishes are filtered by entrée types and dinner dishes for two portions (510*a*-510*c*), and further filtered to only show those that are less than 500 calories, low in carbohydrates, and gluten free (filters 515), and then the dishes remaining are ranked (519) by their calorie content, such that the lowest calorie items are shown at the top of the list. In other embodiments, other ranking selection algorithms can be used.

As an alternative to the plurality of food item identifiers retrieved 440 being selected based on the filters and criteria 505-525 per the above step, the set of candidate dishes determined 450 can be the stage at which the filters and criteria 505-525 are applied, according to one embodiment. Typically a user will choose whether to apply the filters and criteria at the food item or dish stage during initial system set up, with the default being to apply the filters and criteria at the dish selection level.

According to one embodiment, the set of candidate dishes next are ranked 460 based at least in part on a percentage of food items associated with the retrieved food item identifiers included in the candidate dish. In other words, the ranking 460 of the candidate dishes takes into consideration the food item identifiers present in the relevant inventory. For example, if the food item identifiers were retrieved 440 from the personal inventory database, the ranking 460 is based at least in part on the percentage of items in the dish that are present in the personal inventory database. Thus, the most highly ranked items, in this example, would be the dishes that, in addition to meeting any other of the criteria and filters, have the highest percentage of their items (ingredients) in the personal food inventory of the personal inventory database. Likewise, if the food item identifiers were retrieved 440 from the vendor database, the ranking 460 is based at least in part on the percentage of items in the dish that are present in the vendor database. Thus, the most highly ranked items, in this example, would be the dishes that have the highest percentage of their ingredients in the vendor database.

Once the candidate dishes are ranked 460, one or more dishes from the set of candidate dishes is selected 470 for display to the user, with the selection based at least in part on the rankings described above. According to one embodiment, the filters and criteria 505-525 are applied at this selection stage, such that the dishes all are ranked 460, and then the filters and criteria 505-525 are applied to the selection 470. Some filter criteria may be applied at different stages. For example, the specific quantity of dishes requested via dish quantity dropdown 510 and the selection of whether or not to exclude prior recommendations dropdown 520 may not be applied until this selection 470 step. In addition, foods previously recommended, even if removed from the list for some period of time, would recycle back in to the candidate pool eventually.

Once selected 470, an output interface is provided 480, including information describing the selected one or more dishes. Selected dishes are stored in the personal inventory in order to build and maintain a prior recommendation list to prevent the system from continuing to repeatedly recommend the same dish. In addition, according to one embodiment the display may show the user the number of dish choices that correspond to each filter and criteria, e.g., allowing the user to see that if they are shown too many dishes, they can add additional filters or criteria, and if too few, they can see which filters are having the greatest impact. An example is shown under heading 605b in FIG. 6A.

In some embodiments, variations of the user interface can provide additional functionality. For example, according to one embodiment, the user can select a large number of dishes and use a calendar interface to set up meal planning. In one example, the user can receive an alert if a food item in a selected dish is not available at a preferred vendor. With this information, a user can select to add an additional preferred vendor 120, choose a different ingredient to substitute, choose a dish without the missing item, etc.

Figure 6A:
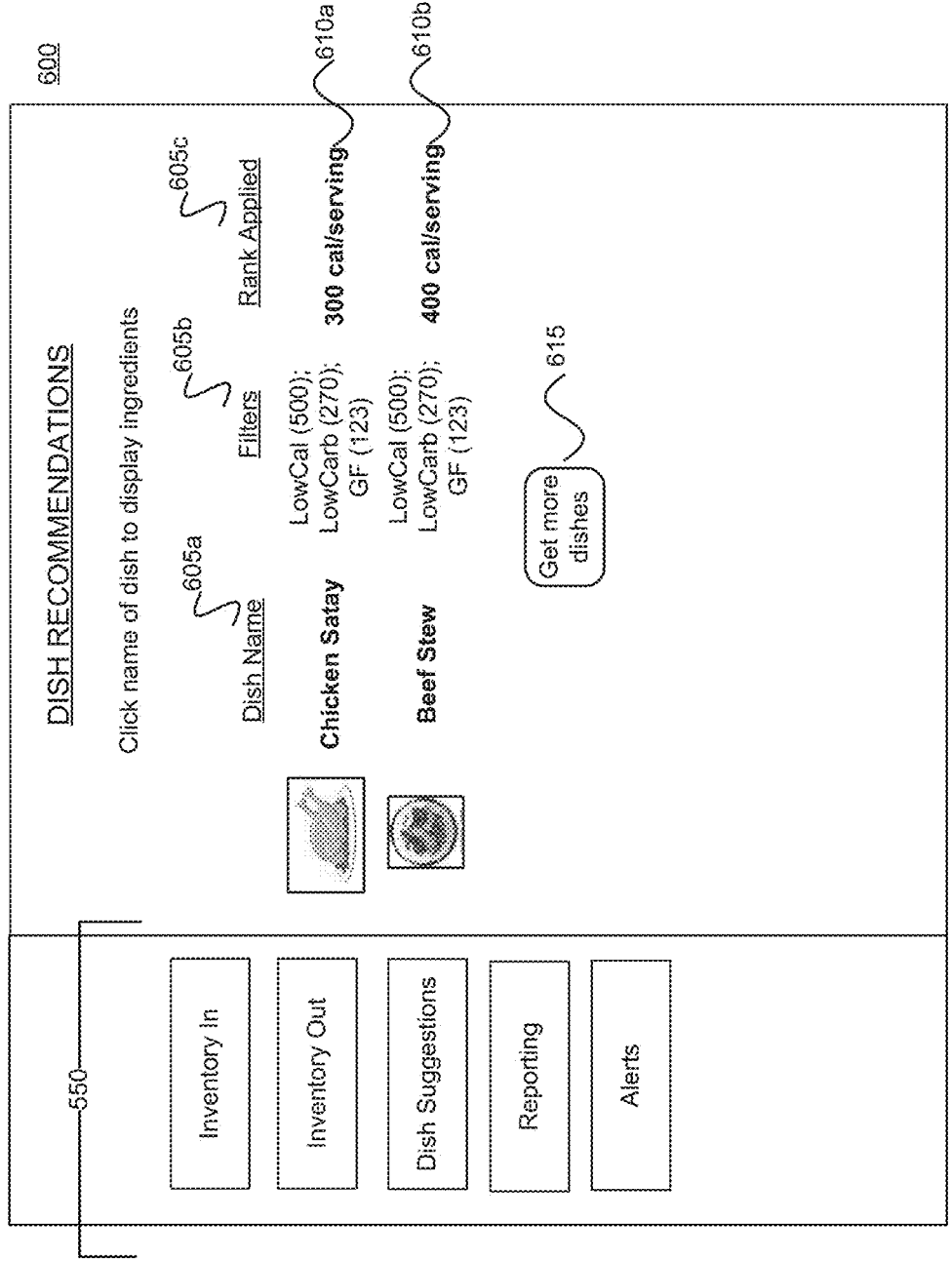
FIG. 6A illustrates an example of a user interface for displaying a selected dish according to one embodiment.

FIG. 6A illustrates an example of a user interface 600 for displaying the selected 470 dishes and related information according to one embodiment. User interface 600 displays two dish results 610a, 610b. In this example, the user requested two dishes be provided, and the filters applied were low calories, low carbohydrates, and gluten free, and the ranking applied was low calories. The display order is that determined during the ranking 460 and selection 470 steps, according to one embodiment. For each dish 610, the dish name, and filter information is displayed by the user interface 600 using various headings 605a-605c. Each heading 605a-605c is selectable, allowing the user to re-sort the order of the dishes displayed, if desired. A get more dishes control 615 is selectable to allow the user to add more dishes to the displayed dishes 610. Each dish 610 also is selectable for displaying additional details about the selected dish 610.

According to various embodiments, additional information may be displayed in user interface 600. For example, selectable controls may allow a user to get a recipe for a dish 610, a list of kitchen appliances needed to make the dish 610, a shopping list of food items needed to prepare the dish 610, nutritional information for the dish 610, etc. In addition, vendors and/or food item suppliers can sponsor items for more prominent display in the interface 600, e.g., by sponsoring a particular food item that goes into a dish 610. In one embodiment, the interface 600 indicates that the item is sponsored, as discussed in conjunction with FIG. 6B.

Figure 6B:
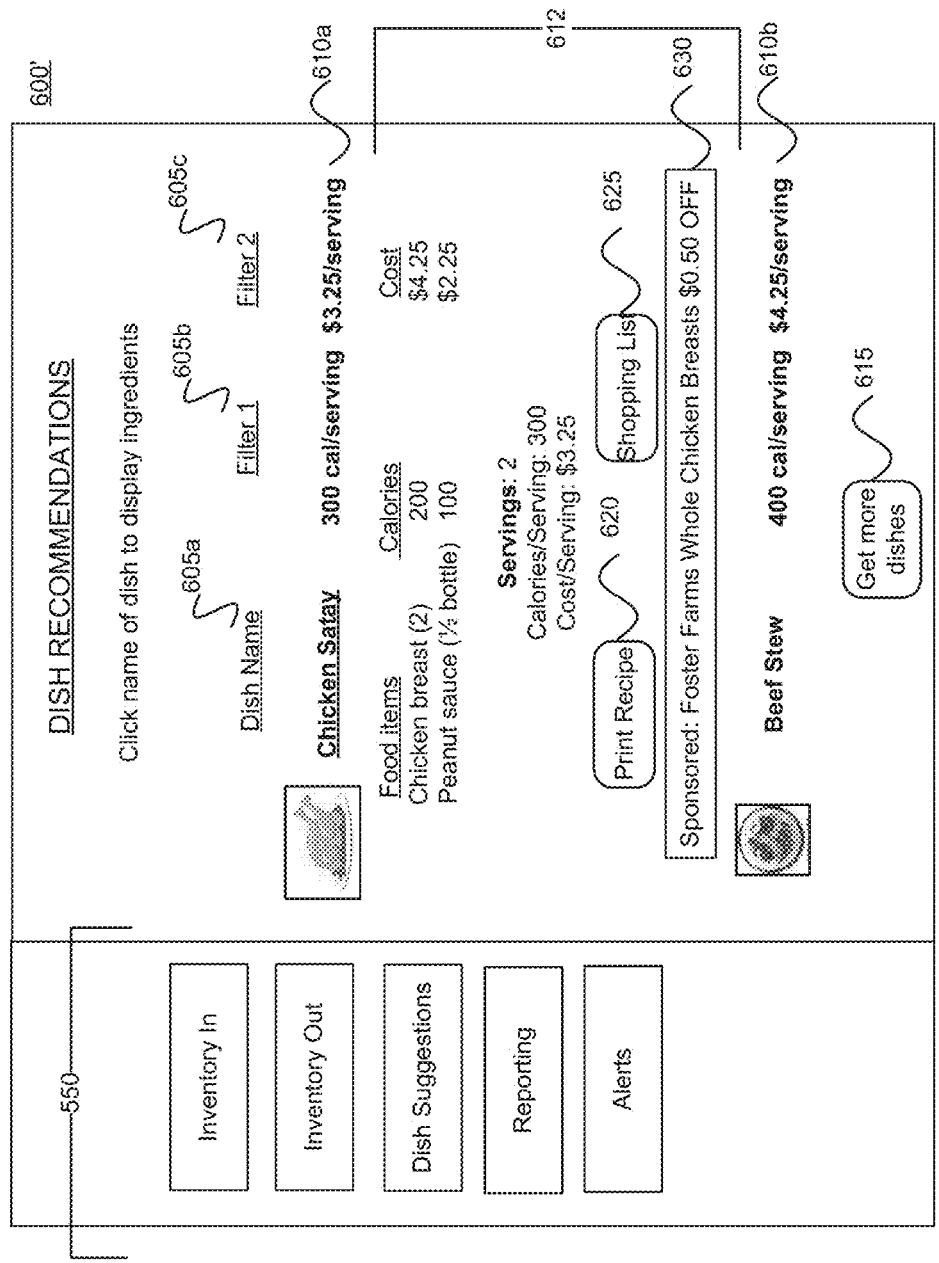
FIG. 6B illustrates an example of a user interface for displaying expanded selected dish information according to one embodiment.

FIG. 6B illustrates an example of a user interface 600' for displaying the selected 470 dishes after selection of dish 610a according to one embodiment. User interface 600' displays an expanded view 612 of dish 610a according to one embodiment. In this example, dish 610a has been expanded 612 to display each food item and its quantity in the dish 610a, as well as the number of servings the dish 610a provides, and detailed per serving information for the applied filters. In addition, the expanded section 612 includes one or more selectable controls 620, 625, e.g., for selecting to print the recipe 620 associated with the dish 610a or to display or print a shopping list 625 associated with the dish 610a. In the instance in which the vendor inventory is the inventory used for retrieving 440 the plurality of food item identifiers, an additional filter is added by the system upon selection of the shopping list control 625, that takes into account the availability of food items in the personal inventory for the user and removes them from the shopping list, according to one embodiment.

A shopping list is built by the account user over time according to one embodiment, e.g., as items are consumed such that the personal inventory for the food item is reduced to zero. When this occurs, the PFIS 110 prompts the user whether the food item should be added to a shopping list. In other embodiments, the shopping list is creased based on meals recommended and selected. According to one embodiment, the shopping list includes information from the vendor 120, such as brands available, aisle locations in the store, prices, and other information relevant to the account user when shopping for the food items. In this way, the application 165 also helps the account user in the process or purchase planning in addition to meal planning.

Also in this example, the expanded section 612 includes a sponsored item 630 corresponding to a food item in the selected dish 610a. This example shows a coupon corresponding to one of the food items include in the selected dish 610a. The sponsored items may work as follows according to one embodiment. Take the dish chicken satay 610a. The food items included are chicken breast and peanut sauce. However, there may be many different brands of chicken breast and of peanut sauce. In the example shown, a coupon is provided for a particular brand of chicken breasts, and it is indicated to the user that it is a sponsored item. In this way, sponsorship may not affect the ranking of the items, but may factor into which brands are shown as available for purchase once a dish is recommended. In another embodiment, a sponsor may have an impact on a food item's inclusion in a recipe recommendation for a user, assuming all other user-specified filters, criteria, etc. are met.

According to one embodiment, the system maps between the ingredients needed for a dish and specific items/brands of that ingredient available at the preferred vendor 120. When multiple items are available of the same ingredient, the application 165 may provide various brands and their prices, so that the user can select the desired item and/or the desired price. This aspect also assists the user in budgeting for grocery shopping. This selection process also permits sponsored product advertisement and/or providing of coupons.

Figure 7:
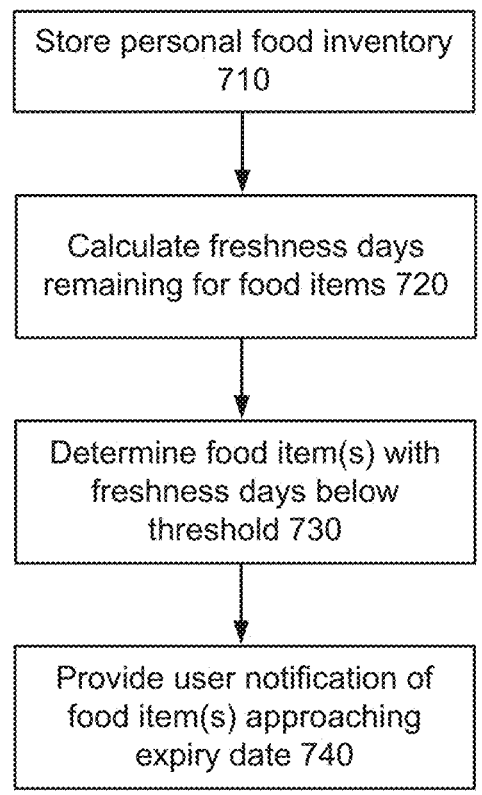
FIG. 7 is a flowchart depicting a computer executed method of providing notification of items nearing an expiry date according to one embodiment.

FIG. 7 is a flowchart depicting a method of providing notification of items nearing an expiry date according to one embodiment. By providing a user with information about food items nearing their expiry date, the method can assist the user in consuming those items so that less food is wasted.

According to the method, a personal food inventory associated with an account for a user of an electronic device is stored 710 in a personal inventory database, e.g., 160. As described in conjunction with the above methods, the personal food inventory includes food records that each include a food item identifier and information describing the food item associated with the food item identifier. In this method, the food records also each include a freshness start date and an expiry date for the food item. For example, the freshness start date might be the purchase date in some circumstances, or it might be set by the vendor 120 in other circumstances, or it might be the date that a package is opened.

The expiry date may come from any of various sources. For example, some food items are sold with an associated expiration date. In these circumstances, the provided expiration date may be used, and may be provided by the vendor selling the food item along with the other information corresponding to the food item, e.g., in the message communicated to the PFIS 110 upon putting the food item into the personal inventory. Likewise, some items are sold with a sell by date. In these circumstances, the expiry date can be determined based on the type of food item in combination with the sell by date. For some food items, no date is provided, however, an expiry date can be calculated based on the type of food item, based on the purchase date.

According to one embodiment, the system tracks a total of five dates relevant to freshness of food items: (1) purchase date, (2) open/defrost date, (3) storage format change date, (4) best before date, and (5) consume before date. Of these, only (4) and (5) are of concern to the user, however, the system may use all five dates for determining freshness information accurately.

In some circumstances, the vendor 120 provides the freshness date information. In the absence of such information, the food database 162 tracks each item with a high-risk or non-high-risk label. High-risk items are those that might cause a health issue if eaten past the "consume by" date, such as meat, poultry, and dairy products. Information provided by the USFDA is a source of this information according to one embodiment. If an item is considered high-risk, the user would be prompted by the application 165 to input consume by information upon entry of the food item into the personal inventory.

For non-high-risk food items, the personal database 160 would store further information about storage of the food item, e.g., refrigerated versus frozen, opened, etc. Each time the user takes an action related to the food item (e.g., opening a box), they would log that action in the application 165. As a default the system assumes that the food item is stored in the same manner as it is stored at the preferred vendor 120, and the user would need to manually override this default if a different storage format is used.

According to one embodiment, the expiry date is triggered by a date on which the item was first opened, e.g., as measured by initial consumption date. As items are added into the personal food inventory, e.g., via the method described in conjunction with FIG. 3, freshness start dates and an expiry dates are determined for the added items. In some cases there may be more than one date associated with the freshness of a food item. For example, for some foods, there may be a date past which the food is no longer considered "fresh" but still is safe to eat, and a second date after which the food may no longer be safe to eat. In addition, some items, e.g., meat or chicken, may have a date that corresponds to a date by which the item should either be eaten or frozen. In the case of an item reaching that date or otherwise placed in freezer storage, the account user could update that information in the personal inventory and a new freshness duration would be determined based on the length of time that the item remains fresh after freezing (e.g., before freezer burn sets in, etc.). In some instances the freshness information is received from the vendor 120 with other transaction information about the food item upon purchase. In other cases, a separate data source is consulted with information regarding typical longevity of food items.

For each of the food items in the personal food inventory, the method calculates 720 a number of freshness days remaining between a current date and the expiry date for the food item. The calculated number of freshness days remaining also is stored in the personal food inventory according to one embodiment. Alternatively, the system may have a freshness duration from which the expiration date can be calculated, and then the days between the current date and expiration date are freshness days remaining.

Next the method determines 730 one or more food items in the personal food inventory for which the calculated 720 number of freshness days remaining is less than a threshold number of days. The threshold number of days for an item may vary by item. For example, some foods may have a more strictly defined shelf life, after which it is not safe to eat, e.g., eggs or chicken, whereas other items may have a longer shelf life, e.g., crackers or canned items. The threshold thus can be pre-determined or can be a default threshold per item according to one embodiment, and/or customizable by the user. In some embodiments, the threshold may be a relative rather than absolute number, e.g., that 90% of an item's freshness days have elapsed. Some items may have multiple thresholds, for example, one for nearing the end of the freshness days, and one for having passed the freshness days (e.g., if the item is no longer safe to eat). In one embodiment, the freshness trigger for a particular food item is based on data provided by food scientists or established literature regarding freshness, longevity, appearance, and other factors impacting food item quality.

In addition, different quantities of food items can have different freshness days remaining. For example, a user may purchase a loaf of bread each week, even if not all of the bread is consumed. The bread purchased first will reach its minimum threshold freshness sooner than the bread purchased the following week, and thus two different thresholds can apply. In one embodiment, the PFIS 110 assumes a first in, first out policy for multiple items of the same food. In another embodiment, each individual package is tracked separately. For example, a first milk carton might be associated with its earlier purchase date and a second milk carton with a second, later purchase date so that the user can tell the difference between the two items in the PFIS 110. Fewer redundant purchases should result from the user having the application 165 available at the point of purchase, and thus information about the personal inventory quantity readily available to assist with purchase decisions.

Once one or more food items are determined 730 to have less freshness days remaining than the threshold for the item, the method provides 740 a notification to the user, identifying the determined one or more food items as approaching their expiry date. Various notification types may be provided 740 to the user. For example, a notification may be provided 740 in the PFIS application 165, via an email, via a pop-up notification on the user's device or computer, via a text message or other electronic forms of notification. Notifications may be provided to the user on an ongoing basis (e.g., as items reach the freshness minimum threshold), a periodic basis (e.g., once per week, once per day), or only upon request. These filters are applied when the notification is about to be sent. For example, if the timeframe for notification is selected to be only once per week, all notifications during the week would be held. Thus, the system default is initially set such that it notifies the user once per day of items reaching their expiration.

Figure 8:
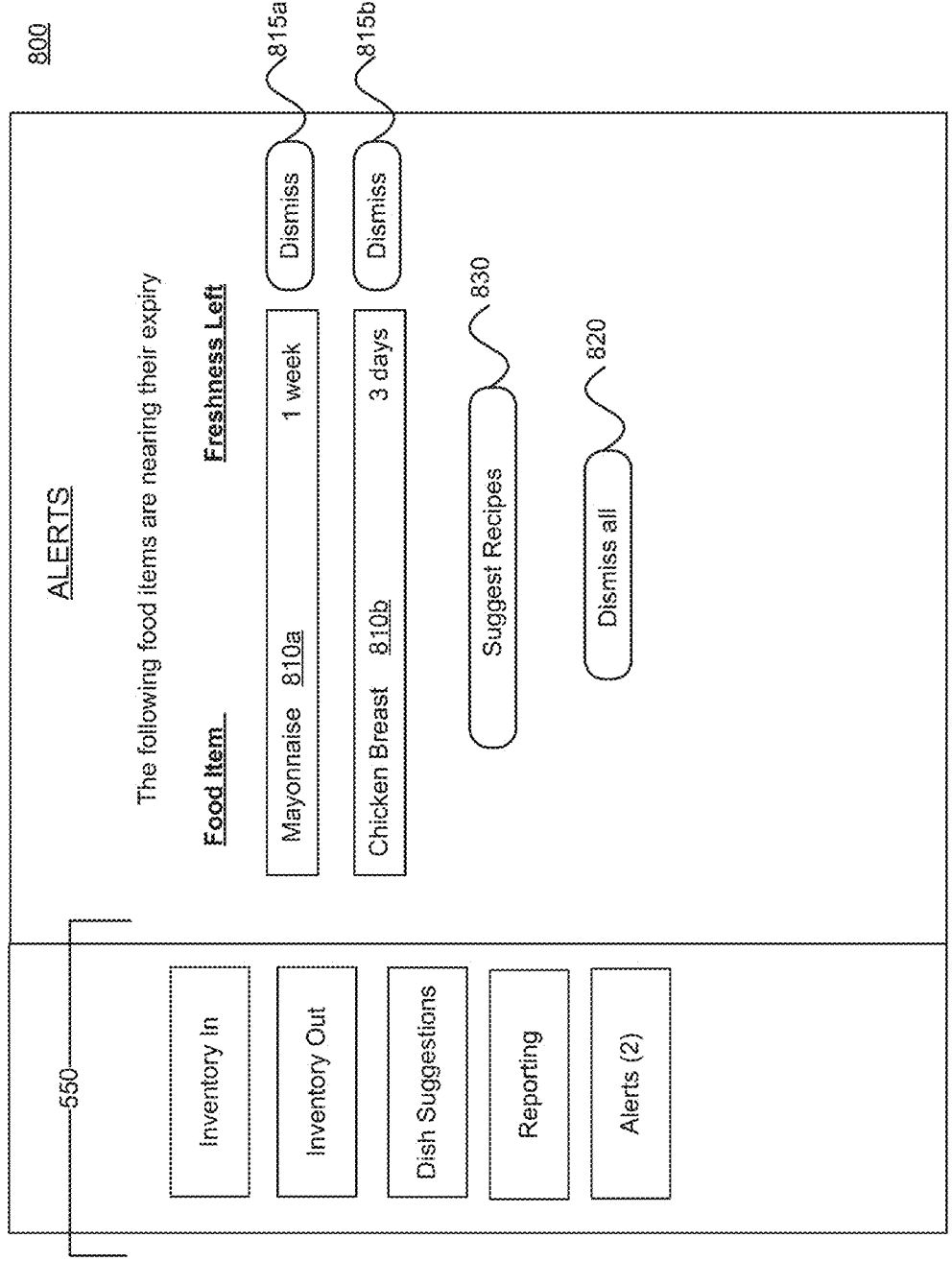
FIG. 8 illustrates an example of a user interface for providing a notification to a user according to one embodiment.

FIG. 8 illustrates an example of a user interface 800 for providing 740 a notification to a user according to one embodiment. In this example, two alerts 810a, 810b are provided, with each listing the food item and freshness remaining. Each item is also paired with a control 815a, 815b that allows each to be dismissed individually, and a separate control 820 is provided to dismiss all of the notifications 810a, 810b at once. Another control 830 is provided in some embodiments to allow the user to retrieve recipes that use the items subject to the notification that they are reaching the end of their freshness. In this example, recipes can be ranked by which include the highest number of items nearing the end of their freshness. If several dishes with similar numbers of expiring items rank similarly, the system can apply other filters such as those used for dish selection above, e.g., cost, calories, etc.

Figure 9:
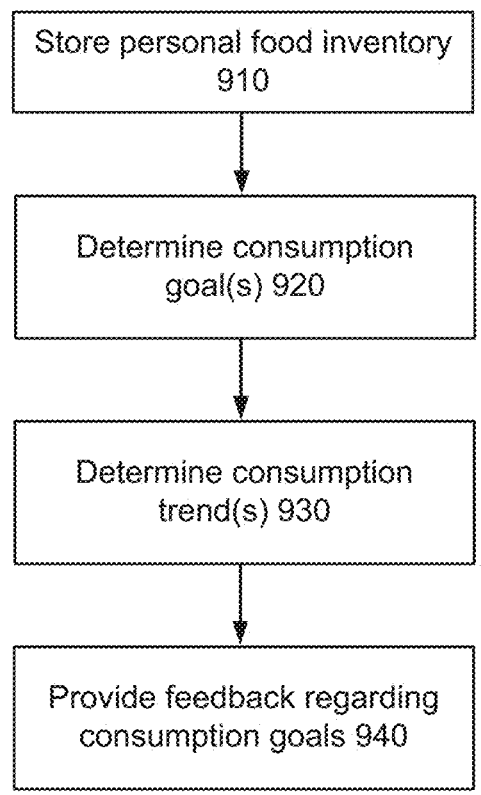
FIG. 9 is a flowchart depicting a method of providing user notification regarding usage of a personal food inventory system according to one embodiment.

FIG. 9 is a flowchart depicting a method of providing user notification regarding usage of a personal food inventory system according to one embodiment.

According to the method, a personal food inventory associated with an account for a user of an electronic device is stored 910 in a personal inventory database of food records. Each food record stores various attributes of the food items. For example, stored with the food item identifier and description may be nutrition information, recyclable packing information, and various other attributes described above in conjunction with personal inventory database 160.

The method determines 920 one or more consumption goals associated with the account. According to one embodiment, a consumption goal can be nutrition based. For example, a nutrition-based consumption goal may be to keep the overall fat content of the food items consumed to 25% or below. Various other consumption goals can be applied, such as other nutrition-based goals such as low calories, low carbohydrates, gluten free foods, or non-nutrition based goals such as low food wastage, lowest cost items, etc. According to another embodiment, a consumption goal can be based on non-nutrition factors. For example, a consumption goal could be related to how much recyclable packaging is used in the items consumed, e.g., a goal of at least 60% recyclable packing for food items consumed. According to one embodiment, the system tracks consumption on a per account basis. For example, upon set up the user selects a number of users for the account, e.g., corresponding to the number of people in the household. Thus, the nutrition, recycling, or other goals thus are household goals rather than individual user goals, as are the consumption trends.

According to the method, one or more trends of consumption of food items by the account associated with the user are determined 930. For example, by tracking consumption of food items, the system can monitor which items are consumed and determine trends in the consumption of the items. For example, if the user is spending more on food items than his budget allows, the system can help identify the most expensive items or those purchased and not consumed prior to expiration. In the case of spending, for example, the use may be able to identify that high costs items are being purchased for a specific recipe. In this example, a database would track spending, and would identify anomalies based on differing levels of spending on food items. Thus, the goal may be to identify a variance in spending.

The identified trends need not correspond to the consumption goals. For example, even if a user has not established a low fat diet as a consumption goal, the system can identify if the user is consuming a high fat diet based on accepted nutritional guidelines, and thus can identify the trend. For example, the system could consider the overall total of calories consumed for all food items for a given time period, and then consider how many grams of fat or how many of the calories came from fat, for example, and compare these numbers to established nutritional guidelines for "low fat" diets.

The method also outputs 940 notification based at least in part on the one or more consumption goals and the one or more patterns of consumption of the food items. For example, various reporting functions can be provided by the system. The reporting can identify, for example, how well the user is doing at meeting the consumption goal(s). The system then also can provide recommendations to the user, either to help better meet one or more consumption goals, and/or reversed any undesirable trends identified. For example, in the case of a nutrition goal, in addition to providing reporting on how well a goal was met, recipes can be provided to help the user better meet the goal.

Figure 10:
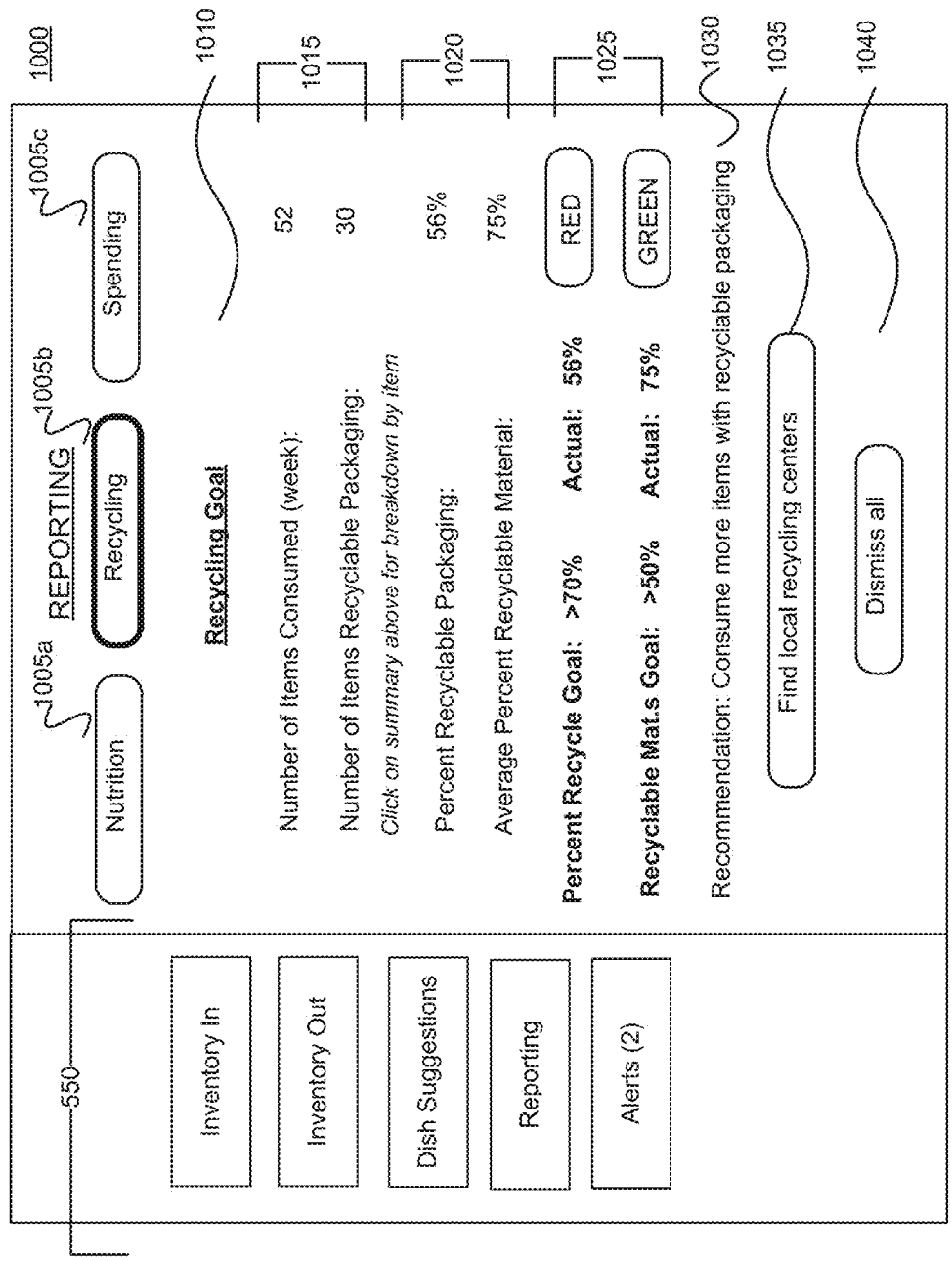
FIG. 10 illustrates an example of a user interface for providing notification to a user based at least in part on one or more consumption goals and/or one or more patterns of consumption of the food items according to one embodiment.

FIG. 10 illustrates an example of a user interface 1000 for outputting 940 notification to a user based at least in part on the one or more consumption goals and the one or more patterns of consumption of the food items according to one embodiment. The reporting interface 1000 shows three consumption goals 1005 in this example: Nutrition (1005a), Recycling (1005b), and Spending (1005c). In the depicted example, Recycling 1005b is selected. The user interface 1000 displays the name of the goal 1010, as well as details about the goal tracking, such as overall numbers 1015 and percentages 1020, as well as a measure of how well the user is doing at meeting the consumption goals, as shown by measures 1025. One or more recommendations 1030 for meeting the goal may be provided. In some instances, the recommendation is a selectable control that can provide greater detail regarding how to better achieve the stated consumption goal. For example, for the goal of greater recycling, information can be provided about which manufacturers produce items with greater amount of recyclable materials, which items cannot be recycled that the user may want to avoid, and offer alternatives to items purchased by not aiding in the recycling goal, to name a few. In addition, one or more detailed recommendations can include selectable controls 1035 for providing greater information for meeting goals. In the example depicted in FIG. 10, the control 1035 is "find local recycling centers" to aid the user in recycling efforts. A further control is provided to dismiss 1040 the recommendations. Different controls and information would be displayed according to different consumption goals.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the data management service may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for securing and monitoring sensitive data. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

The invention claimed is:

1. A computer-executed method of tracking a personal food inventory associated with an account of one or more users, the method comprising:
   storing, in a personal inventory database at a personal food inventory system, a plurality of personal food inventories for a plurality of users of electronic devices, each personal food inventory associated with an account, each personal food inventory comprising a plurality of food records, each food record comprising a food item identifier, information describing a food item associated with the food item identifier, and an inventory quantity of the food item, the plurality of food records generated at a food vendor point of sale (POS) device in a form of a purchased food list;
   providing to the electronic devices an application configured to communicate with the personal food inventory system to access the plurality of personal food inventories for the plurality of users;
   receiving, from the food vendor POS device and via a computer network, the purchased food list comprising a plurality of food item identifiers and a purchase quantity of each food item associated with each food item identifier of the plurality of food item identifiers, for food items purchased from the food vendor by a subset of the plurality of users;
   associating the plurality of food item identifiers and the purchase quantity of each food item purchased by the subset with each account for each user in the subset;
   automatically updating the personal inventory database at the personal food inventory system with, for each personal food inventory associated with each account for each user in the subset, the purchased food list comprising the plurality of food item identifiers, and the purchase quantity for each food item, received from the food vendor, without physically tracking the food items purchased by the subset after purchase using radio-frequency identifiers or a scanner;
   recommending to a user of the subset a dish to prepare comprising an ingredient corresponding to the food item identifier in the personal food inventory associated with the account of the user, wherein the dish is recommended to the user based, at least in part, on (i) a presence of the food item identifier in the personal inventory database, and (ii) a user-provided ranking criterion comprising a consumption goal associated with the account of the user;
   receiving a selection from the user of the dish; and
   in response to receiving the selection, automatically updating, by the personal food inventory system, in the personal food inventory associated with the account, the inventory quantity of the food item associated with the food item identifier corresponding to the ingredient.

2. The method of claim 1, wherein a single account is linked to a plurality of personal food inventories for multiple users.

3. The method of claim 1, wherein the plurality of food item identifiers of food items purchased is associated with the account using a card at the food vendor.

4. The method of claim 1, wherein the plurality of food item identifiers of food items purchased are received from the vendor POS device comprising a scanner device at the food vendor.

5. The method of claim 1, wherein responsive to the inventory quantity of the item being a non-zero number, updating the inventory quantity using the purchased quantity.

6. The method of claim 1, further comprising:
   receiving a notification from the user that at least a portion of a food item associated with an account of the plurality of accounts has been consumed, the notification comprising a food item identifier associated with the consumed item and a consumption quantity; and
   in response to receiving the notification, automatically updating, by the personal food inventory system, in the personal food inventory associated with the account, the inventory quantity of the food item associated with the received food item identifier based at least in part on the consumption quantity, and storing the updated inventory quantity of the food item in the food record of the food item.

7. The method of claim 6, wherein the consumption quantity is a result of eating or loss to spoilage or expiration.

8. The method of claim 6, wherein the notification from the user is responsive to the personal food inventory system prompting the user to notify the personal food inventory system whether the food item is present in the personal food inventory.

9. The method of claim 1, further comprising:
storing consumption quantity information for the plurality of food records for the account, the consumption quantity information comprising a consumption quantity associated with each food item consumed; and
providing a report to the user based on the consumption quantity information.

10. The method of claim 1, further comprising:
receiving a notification that a food item associated with an account of the plurality of accounts has been fully consumed, the notification comprising a food item identifier associated with the consumed item and a consumption quantity; and
providing recycling information to the user associated with packaging for the fully consumed food item.

11. The method of claim 1, further comprising:
receiving a notification that a food item associated with an account of the plurality of accounts has been consumed, the notification comprising a food item identifier associated with the consumed item and a consumption quantity; and
prompting the user for a revised inventory quantity based on the quantity consumed, provided the consumption quantity exceeds the inventory quantity.

12. The method of claim 1, further comprising:
determining one or more consumption goals associated with the account.

13. The method of claim 12, wherein the one or more consumption goals comprises a nutrition based goal.

14. A non-transitory computer-readable storage medium storing executable computer program instructions, the instructions executable to perform steps of tracking a personal food inventory associated with an account of one or more users, comprising:
storing, in a personal inventory database at a personal food inventory system, a plurality of personal food inventories for a plurality of users of electronic devices, each personal food inventory associated with an account, each personal food inventory comprising a plurality of food records, each food record comprising a food item identifier, information describing a food item associated with the food item identifier, and an inventory quantity of each food item, the plurality of food records generated at a food vendor point of sale (POS) device in the form of a purchased food list;
providing to the electronic devices an application configured to communicate with the personal food inventory system to access the plurality of personal food inventories for the plurality of users;
receiving, from the food vendor POS device and via a computer network, the purchased food list comprising a plurality of food item identifiers and a purchase quantity of each food item associated with each food item identifier of the plurality of food item identifiers, for food items purchased from the food vendor by a subset of the plurality of users;
associating the plurality of food item identifiers and the purchase quantity of each food item purchased by the subset with each account for each user in the subset;
automatically updating the personal inventory database at the personal food inventory system with, for each personal food inventory associated with each account for each user in the subset, the purchased food list comprising the plurality of food item identifiers, and the purchase quantity for each food item, received from the food vendor, without physically tracking the food items purchased by the subset after purchase using radio-frequency identifiers or a scanner;
recommending to a user of the subset a dish to prepare comprising an ingredient corresponding to the food item identifier in the personal food inventory associated with the account of the user, wherein the dish is recommended to the user based, at least in part, on (i) a presence of the food item identifier in the personal inventory database, and (ii) a user-provided ranking criterion comprising a consumption goal associated with the account of the user;
receiving a selection from the user of the dish; and
in response to receiving the selection, automatically updating, by the personal food inventory system, in the personal food inventory associated with the account, the inventory quantity of the food item associated with the food item identifier corresponding to the ingredient.

15. The computer-readable storage medium of claim 14, wherein a single account is linked to a plurality of personal food inventories for multiple users.

16. The computer-readable storage medium of claim 14, wherein the plurality of food item identifiers of food items purchased is associated with the account using a card at the food vendor.

17. The computer-readable storage medium of claim 14, wherein the plurality of food item identifiers of food items purchased are received from the vendor POS device comprising a scanner device at the food vendor.

18. The computer-readable storage medium of claim 14, wherein responsive to the inventory quantity of the item being a non-zero number, updating the inventory quantity using the purchased quantity.

19. The computer-readable storage medium of claim 14, further comprising:
receiving a notification from the user that at least a portion of a food item associated with an account of the plurality of accounts has been consumed, the notification comprising a food item identifier associated with the consumed item and a consumption quantity; and
in response to receiving the notification, automatically updating, by the personal food inventory system, in the personal food inventory associated with the account, the inventory quantity of the food item associated with the received food item identifier based at least in part on the consumption quantity, and storing the updated inventory quantity of the food item in the food record of the food item.

20. The computer-readable storage medium of claim 19, wherein the consumption quantity is a result of eating or loss to spoilage or expiration.

21. The computer-readable storage medium of claim 19, wherein the notification from the user is responsive to the personal food inventory system prompting the user to notify the personal food inventory system whether the food item is present in the personal food inventory.

22. The computer-readable storage medium of claim 14, further comprising:
storing consumption quantity information for the plurality of food records for the account, the consumption quantity information comprising a consumption quantity associated with each food item consumed; and
providing a report to the user based on the consumption quantity information.

23. The computer-readable storage medium of claim 14, further comprising:

receiving a notification that a food item associated with an account of the plurality of accounts has been fully consumed, the notification comprising a food item identifier associated with the consumed item and a consumption quantity; and providing recycling information to the user associated with packaging for the fully consumed food item.

24. The computer-readable storage medium of claim 14, further comprising:

receiving a notification that a food item associated with an account of the plurality of accounts has been consumed, the notification comprising a food item identifier associated with the consumed item and a consumption quantity; and prompting the user for a revised inventory quantity based on the quantity consumed, provided the consumption quantity exceeds the inventory quantity.

\* \* \* \* \*